(12) United States Patent
Nakano et al.

(10) Patent No.: US 10,305,322 B2
(45) Date of Patent: May 28, 2019

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventors: Toshihide Nakano, Chuo-ku (JP); Yousuke Ooura, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/770,928

(22) PCT Filed: Dec. 1, 2015

(86) PCT No.: PCT/JP2015/083682
§ 371 (c)(1),
(2) Date: Apr. 25, 2018

(87) PCT Pub. No.: WO2017/094093
PCT Pub. Date: Jun. 8, 2017

(65) Prior Publication Data
US 2018/0309319 A1    Oct. 25, 2018

(51) Int. Cl.
*H02J 9/00* (2006.01)
*H02J 9/06* (2006.01)

(52) U.S. Cl.
CPC .............. *H02J 9/062* (2013.01); *H02J 9/06* (2013.01)

(58) Field of Classification Search
CPC .................................. H02J 9/062; H02J 9/06
See application file for complete search history.

(56) References Cited

U.S. PATENT DOCUMENTS

| 2008/0203820 A1* | 8/2008 | Kramer | ..................... H02J 3/38 |
| | | | 307/64 |
| 2013/0015704 A1* | 1/2013 | Tsai | ........................ H02J 9/062 |
| | | | 307/23 |
| 2015/0188362 A1* | 7/2015 | Mondal | .................. H02M 3/156 |
| | | | 307/52 |

FOREIGN PATENT DOCUMENTS

| JP | 11-341686 A | 12/1999 |
| JP | 2003-333753 A | 11/2003 |

OTHER PUBLICATIONS

International Search Report dated Feb. 9, 2016, in PCT/JP2015/083682 filed Dec. 1,2015.

* cited by examiner

*Primary Examiner* — Rexford N Barnie
*Assistant Examiner* — Thai H Tran
(74) *Attorney, Agent, or Firm* — Oblon, McClelland, Maier & Neustadt, L.L.P.

(57) ABSTRACT

When three phase AC voltages (Vi1 to Vi3) from a commercial AC power supply (51) become abnormal, a control circuit (6) of an uninterruptible power supply device provides an OFF command signal to first to third switches (1a to 1c), and causes first to third power converters (2a to 2c) to output first to third direct currents, respectively, and quickly extinguish arcs in the first to third switches (1a to 1c). On this occasion, polarities of the first to third direct currents are the same as polarities of currents (Is1 to Is3) flowing into the first to third switches (1a to 1c), respectively, and the sum of values of the first to third direct currents is 0.

6 Claims, 5 Drawing Sheets

UNINTERRUPTIBLE POWER SUPPLY DEVICE

TECHNICAL FIELD

The present invention relates to an uninterruptible power supply device, and in particular to a continuous commercial power supply-type uninterruptible power supply device.

BACKGROUND ART

A continuous commercial power supply-type uninterruptible power supply device includes a switch having a first terminal for receiving alternating current (AC) power from a commercial AC power supply and a second terminal connected to a load, and a power converter connected to the load. When an AC voltage from the commercial AC power supply is normal, the switch is set to an ON state, and the AC power from the commercial AC power supply is supplied to the load via the switch. When the AC voltage from the commercial AC power supply becomes abnormal, the switch is set to an OFF state, and direct current (DC) power supplied from a DC power supply is converted into AC power by the power converter and supplied to the load.

Japanese Patent Laying-Open No. 11-341686 (PTD 1) and Japanese Patent Laying-Open No. 2003-333753 (PTD 2) disclose a technique in which a switch without having self arc extinguishing capability is used, and, when an AC voltage from a commercial AC power supply becomes abnormal, an output current of a power converter is controlled to reduce a current flowing into the switch and quickly extinguish an arc in the switch.

CITATION LIST

Patent Document

PTD 1: Japanese Patent Laying-Open No. 11-341686
PTD 2: Japanese Patent Laying-Open No. 2003-333753

SUMMARY OF INVENTION

Technical Problem

However, although PTDs 1 and 2 disclose an uninterruptible power supply device for a single phase, these documents do not disclose an uninterruptible power supply device for three phases. When an uninterruptible power supply device for three phases is configured by merely providing three uninterruptible power supply devices for a single phase, operation of three phases becomes unbalanced, and operation becomes unstable.

Accordingly, a main object of the present invention is to provide an uninterruptible power supply device for three phases which operates stably.

Solution to Problem

An uninterruptible power supply device in accordance with the present invention is a continuous commercial power supply-type uninterruptible power supply device, including: first to third output terminals for supplying three phase alternating currents to a load; first to third switches without having self arc extinguishing capability, having first terminals for receiving three phase AC voltages from a commercial AC power supply, and second terminals connected to the first to third output terminals, respectively; first to third power converters connected to the first to third output terminals, respectively, and driven by DC power supplied from a DC power supply; an abnormality detector configured to detect that the three phase AC voltages from the commercial AC power supply become abnormal; first to third current detectors configured to detect instantaneous values of currents flowing into the first to third switches, respectively; and a control circuit configured to control the first to third switches and the first to third power converters based on detection results of the abnormality detector and the first to third current detectors. When the three phase AC voltages from the commercial AC power supply are normal, the first to third switches are set to an ON state, and three phase alternating currents are supplied from the commercial AC power supply to the load via the first to third switches. When the three phase AC voltages from the commercial AC power supply become abnormal, an OFF command signal is provided from the control circuit to the first to third switches, first to third direct currents are output from the first to third power converters, respectively, and arcs in the first to third switches are extinguished, and further, three phase alternating currents are supplied from the first to third power converters to the load and operation of the load is continued. When a polarity of a current flowing from the first terminal toward the second terminal of each of the first to third switches is assumed as a positive polarity, and polarities of currents flowing from the first to third power converters toward the first to third output terminals, respectively, are each assumed as a positive polarity, polarities of the first to third direct currents are the same as polarities of the currents flowing into the first to third switches, respectively, and a sum of values of the first to third direct currents is set to 0.

Another uninterruptible power supply device in accordance with the present invention is a continuous commercial power supply-type uninterruptible power supply device, including: first to third output terminals for supplying three phase alternating currents to a load; first to third switches without having self arc extinguishing capability, having first terminals for receiving three phase AC voltages from a commercial AC power supply, and second terminals connected to the first to third output terminals, respectively; first to third power converters connected to the first to third output terminals, respectively, and driven by DC power supplied from a DC power supply; an abnormality detector configured to detect that the three phase AC voltages from the commercial AC power supply become abnormal; first to third current detectors configured to detect instantaneous values of currents flowing into the first to third switches, respectively; and a control circuit configured to control the first to third switches and the first to third power converters based on detection results of the abnormality detector and the first to third current detectors. When the three phase AC voltages from the commercial AC power supply are normal, the first to third switches are set to an ON state, and three phase alternating currents are supplied from the commercial AC power supply to the load via the first to third switches. When the three phase AC voltages from the commercial AC power supply become abnormal, an OFF command signal is provided from the control circuit to the first to third switches, output currents of the first to third power converters are controlled such that the currents flowing into the first to third switches become first to third direct currents, respectively, and arcs in the first to third switches are extinguished, and further, three phase alternating currents are supplied from the first to third power converters to the load and operation of the load is continued. When a polarity of a current flowing from the first terminal toward the second terminal of each of the first to third switches is assumed as a positive polarity, polarities of the first to third direct currents are opposite to polarities of the currents flowing into the first to third switches, respectively, and a sum of values of the first to third direct currents is set to 0.

Advantageous Effects of Invention

In the uninterruptible power supply device in accordance with the present invention, when the three phase AC voltages from the commercial AC power supply become abnormal, an OFF command signal is provided to the first to third switches, first to third direct currents are output from the first to third power converters, respectively, and arcs in the first to third switches are extinguished, and the sum of values of the first to third direct currents is set to 0. Therefore, operation of three phases can be balanced, and an uninterruptible power supply device for three phases which operates stably can be achieved.

In the other uninterruptible power supply device in accordance with the present invention, when the three phase AC voltages from the commercial AC power supply become abnormal, an OFF command signal is provided to the first to third switches, output currents of the first to third power converters are controlled such that the currents flowing into the first to third switches become first to third direct currents, respectively, and arcs in the first to third switches are extinguished, and the sum of values of the first to third direct currents is set to 0. Therefore, operation of three phases can be balanced, and an uninterruptible power supply device for three phases which operates stably can be achieved.

DESCRIPTION OF EMBODIMENTS

First Embodiment

Figure 1:
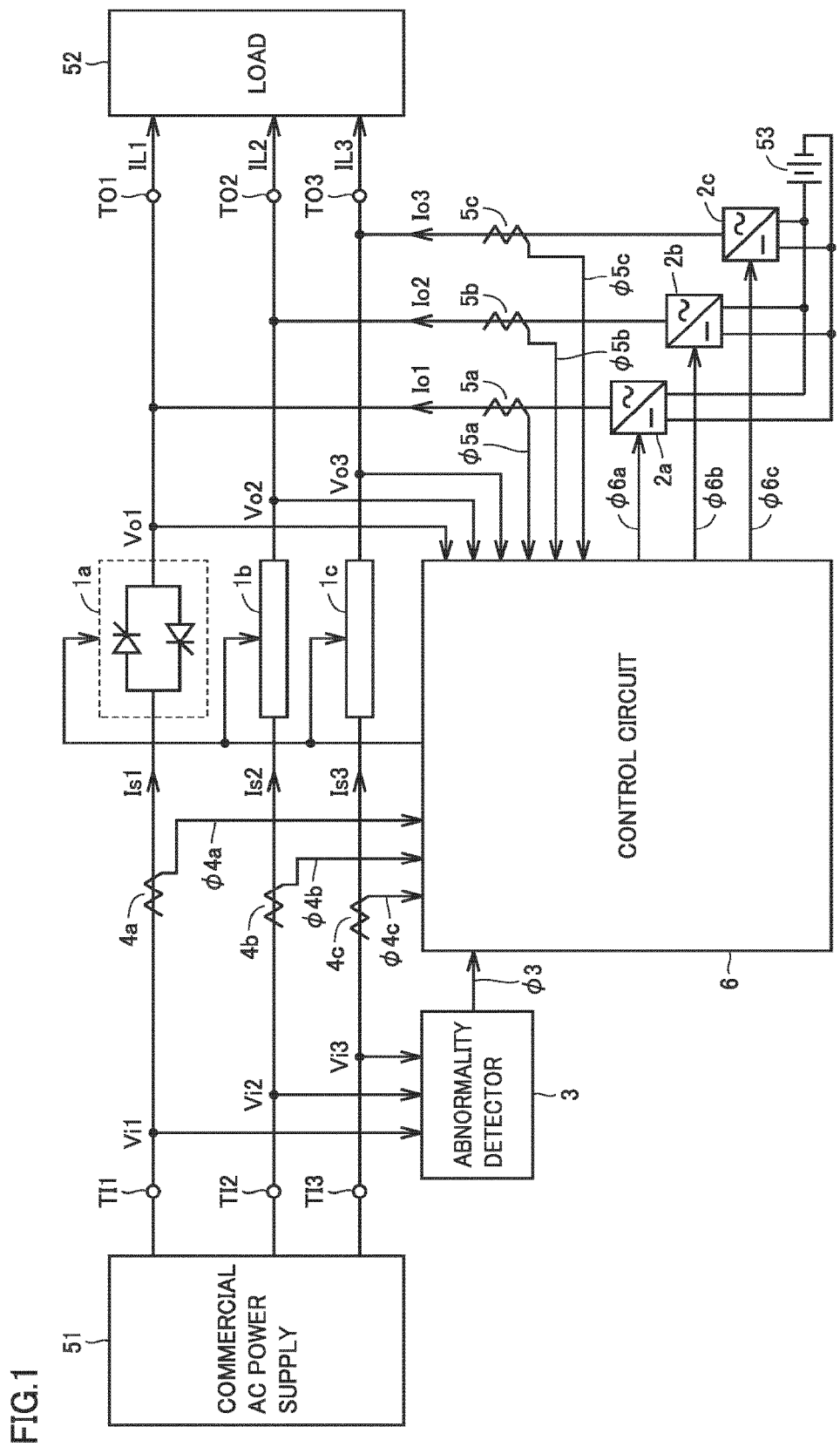
FIG. 1 is a circuit block diagram showing an entire configuration of an uninterruptible power supply device in accordance with a first embodiment of the present invention.

FIG. 1 is a circuit block diagram showing an entire configuration of an uninterruptible power supply device in accordance with a first embodiment of the present invention. In FIG. 1, this uninterruptible power supply device is a continuous commercial power supply-type uninterruptible power supply device, and includes input terminals TI1 to TI3, output terminals TO1 to TO3, switches 1a to 1c, power converters 2a to 2c, an abnormality detector 3, current detectors 4a to 4c and 5a to 5c, and a control circuit 6.

Input terminals TI1 to TI3 receive three phase AC voltages Vi1 to Vi3, respectively, supplied from a commercial AC power supply 51. Output terminals TO1 to TO3 are connected to a load 52 to supply three phase alternating currents to load 52.

Switches 1a to 1c have first terminals connected to input terminals TI1 to TI3, respectively, and second terminals connected to output terminals TO1 to TO3, respectively. Each of switches 1a to 1c is a switch without having self arc extinguishing capability, and includes one pair of thyristors, for example. Of the one pair of thyristors, one thyristor has an anode and a cathode connected to the first and second terminals, respectively, and the other thyristor has an anode and a cathode connected to the second and first terminals, respectively. Each of switches 1a to 1c may include a mechanical switch.

Switches 1a to 1c are controlled by control circuit 6. In an ordinary state where three phase AC voltages Vi1 to Vi3 supplied from commercial AC power supply 51 are normal, switches 1a to 1c are set to an ON state, and when three phase AC voltages Vi1 to Vi3 supplied from commercial AC power supply 51 become abnormal (for example, in a power failure state), switches 1a to 1c are set to an OFF state.

Power converters 2a to 2c are connected to output terminals TO1 to TO3, respectively, and are driven by DC power supplied from a DC power supply 53. Power converters 2a to 2c are controlled by PWM (Pulse Width Modulation) signals $\phi 6a$ to $\phi 6c$, respectively, supplied from control circuit 6. Each of power converters 2a to 2c outputs a desired current among a positive direct current, a negative direct current, and an alternating current.

In an ordinary state where three phase AC voltages Vi1 to Vi3 supplied from commercial AC power supply 51 are normal, power converters 2a to 2c are set to a standby state where they do not output currents. When three phase AC voltages Vi1 to Vi3 supplied from commercial AC power supply 51 become abnormal, each of power converters 2a to 2c outputs a direct current having the same polarity as that of a current flowing into a corresponding switch, and quickly extinguishes an arc in the corresponding switch. On this occasion, the sum of output currents Io1 to Io3 of power converters 2a to 2c is set to 0 A. Further, after power converters 2a to 2c extinguish arcs in switches 1a to 1c, power converters 2a to 2c supply three phase alternating currents to load 52.

Abnormality detector 3 detects whether or not three phase AC voltages Vi1 to Vi3 supplied from commercial AC power supply 51 are normal. When three phase AC voltages Vi1 to Vi3 are normal, abnormality detector 3 sets an abnormality detection signal $\phi 3$ to an "L" level, which is a non-activated level, and when three phase AC voltages Vi1 to Vi3 become abnormal, abnormality detector 3 sets abnormality detection signal $\phi 3$ to an "H" level, which is an activated level. For example, in a power failure state where supply of three phase AC power from commercial AC power supply 51 is stopped, effective values of three phase AC voltages Vi1 to Vi3 are reduced, and abnormality detection signal $\phi 3$ is set to an "H" level, which is an activated level.

Current detectors 4a to 4c are provided between input terminals TI1 to TI3 and switches 1a to 1c, to detect instantaneous values of currents Is1 to Is3 flowing into switches 1a to 1c and output signals $\phi 4a$ to $\phi 4c$ indicating the detected values, respectively. In current detectors 4a to 4c, polarities of currents flowing from input terminals TI1 to TI3 toward output terminals TO1 to TO3 (that is, polarities of currents flowing from the first terminals toward the second terminals of switches 1a to 1c) are each assumed as a positive polarity.

Current detectors 5a to 5c are provided between power converters 2a to 2c and output terminals TO1 to TO3, to detect instantaneous values of output currents Io1 to Io3 of power converters 2a to 2c and output signals $\phi 5a$ to $\phi 5c$ indicating the detected values, respectively. In current detectors 5a to 5c, polarities of currents flowing from power converters 2a to 2c toward output terminals TO1 to TO3 are each assumed as a positive polarity.

Control circuit 6 controls switches 1a to 1c and power converters 2a to 2c, based on output signal φ3 of abnormality detector 3, output signals φ4a to φ4c of current detectors 4a to 4c, output signals φ5a to φ5c of current detectors 5a to 5c, instantaneous values of voltages Vo1 to Vo3 of output terminals TO1 to TO3, and the like.

When abnormality detection signal φ3 is at an "L" level, which is a non-activated level, control circuit 6 provides an ON command signal to switches 1a to 1c to set them to an ON state. In this case, three phase alternating currents are supplied from commercial AC power supply 51 to load 52 via switches 1a to 1c, and load 52 is operated.

When abnormality detection signal φ3 is set to an "H" level, which is an activated level, control circuit 6 provides an OFF command signal to switches 1a to 1c, and causes power converters 2a to 2c to output direct currents to output terminals TO1 to TO3 and quickly extinguish arcs in switches 1a to 1c. On this occasion, polarities of output currents Io1 to Io3 of power converters 2a to 2c are the same as polarities of currents Is1 to Is3 flowing into switches 1a to 1c, respectively, and the sum of values of output currents Io1 to Io3 of power converters 2a to 2c is set to 0.

After the arcs in switches 1a to 1 c are extinguished, control circuit 6 causes power converters 2a to 2c to supply three phase alternating currents to load 52 to continue operation of load 52.

Figure 2:
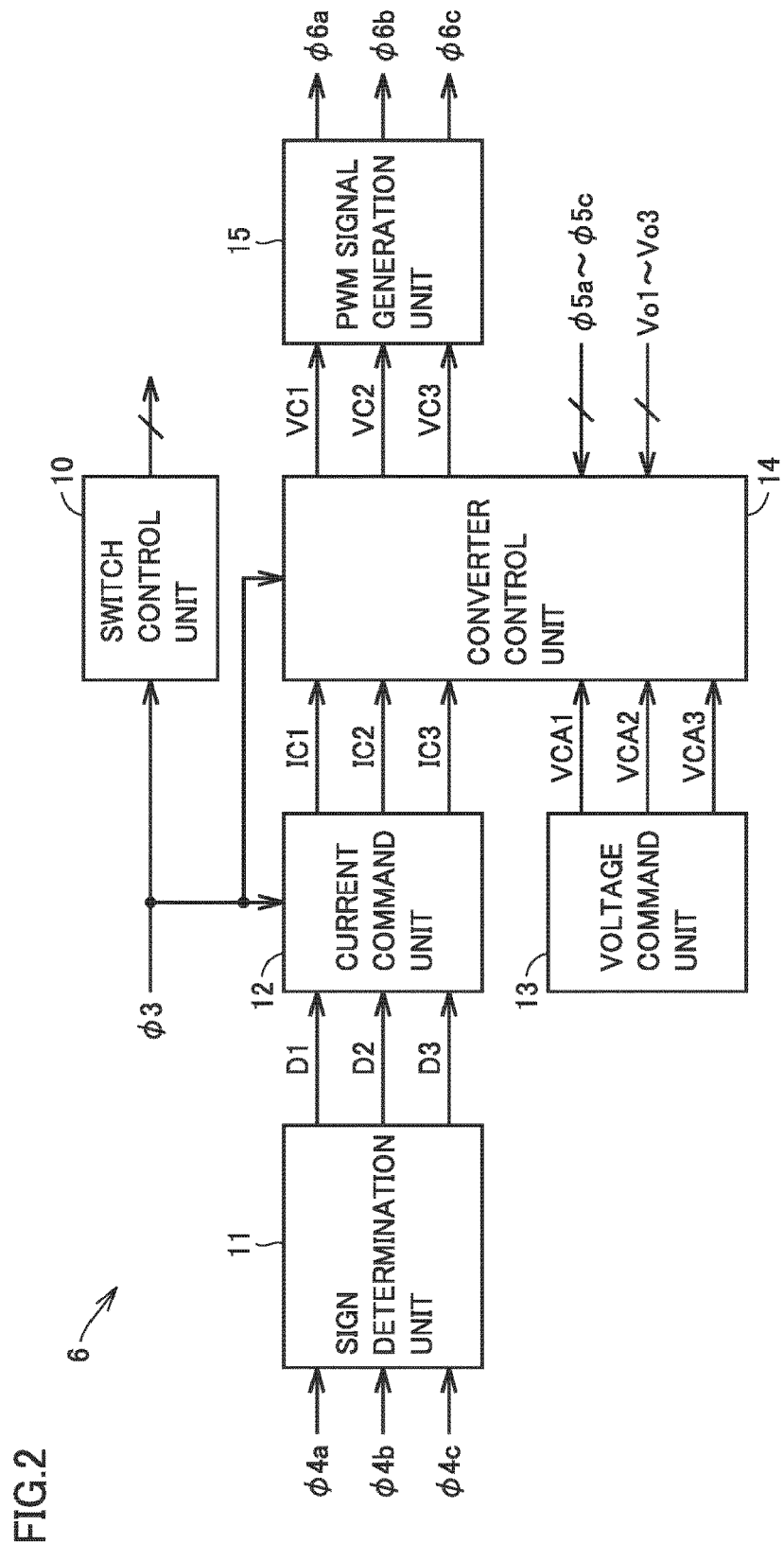
FIG. 2 is a block diagram showing a configuration of a control circuit shown in FIG. 1.

FIG. 2 is a block diagram showing a configuration of control circuit 6. In FIG. 2, control circuit 6 includes a switch control unit 10, a sign determination unit 11, a current command unit 12, a voltage command unit 13, a converter control unit 14, and a PWM signal generation unit 15.

Switch control unit 10 provides an ON command signal to switches 1a to 1c to set switches 1a to 1c to an ON state when abnormality detection signal φ3 is at an "L" level, which is a non-activated level, and provides an OFF command signal to switches 1a to 1c to set switches 1a to 1c to an OFF state when abnormality detection signal φ3 is set to an "H" level, which is an activated level. It should be noted that, in order to set switches 1a to 1c without having self arc extinguishing capability to an OFF state, it is necessary to provide an OFF command signal to switches 1a to 1c, and to set the currents flowing into switches 1a to 1c to 0.

Sign determination unit 11 determines the polarity of each of currents Is1 to Is3 flowing into switches 1a to 1c based on output signals φ4a to φ4c of current detectors 4a to 4c, and outputs signals D1 to D3 indicating determination results. When currents Is1 to Is3 have a positive polarity, signals D1 to D3 are set to an "H" level, and when currents Is1 to Is3 have a negative polarity, signals D1 to D3 are set to an "L" level. When currents Is1 to Is3 flowing into switches 1a to 1c become too small to determine a sign, sign determination unit 11 sets all signals D1 to D3 to an "L" level.

Current command unit 12 is activated when abnormality detection signal φ3 is set to an "H" level, which is an activated level, and generates current command values IC1 to IC3 such that direct currents Io1 to Io3 having the same polarities as those of currents Is1 to Is3 flowing into switches 1a to 1c are output from power converters 2a to 2c. Thereby, load currents IL1 to IL3 are at least partially supplied from power converters 2a to 2c, currents Is1 to Is3 flowing into switches 1a to 1c are reduced, and arcs in switches 1a to 1c are quickly extinguished. On this occasion, the sum of current command values IC1 to IC3 is set to 0, and the sum of direct currents Io1 to Io3 is set to 0.

Voltage command unit 13 outputs three phase voltage command values VCA1 to VCA3 which vary sinusoidally with the same frequencies as those of three phase AC voltages Vi1 to Vi3 supplied from commercial AC power supply 51. Current command values IC1 to IC3 and voltage command values VCA1 to VCA3 are provided to converter control unit 14.

Converter control unit 14 operates based on abnormality detection signal φ3, current command values IC1 to IC3, voltage command values VCA1 to VCA3, output signals φ5a to φ5c of current detectors 5a to 5c, and output voltages Vo1 to Vo3.

When abnormality detection signal φ3 is at an "L" level, which is a non-activated level, converter control unit 14 outputs voltage command values VC1 to VC3 at levels corresponding to deviations VCA1-Vo1, VCA2-Vo2, and VCA3-Vo3 between voltage command values VCA1 to VCA3 and output voltages Vo1 to Vo3. Thereby, output currents Io1 to Io3 of power converters 2a to 2c are controlled such that output voltages Vo1 to Vo3 match voltage command values VCA1 to VCA3, respectively, and power converters 2a to 2c are set to a standby state.

When abnormality detection signal φ3 is set to an "H" level, which is an activated level, converter control unit 14 outputs voltage command values VC1 to VC3 at levels corresponding to deviations IC1-Io1, IC2-Io2, and IC3-Io3 between current command values IC1 to IC3 and detected values Io1 to Io3 of current detectors 5a to 5c. Thereby, output currents Io1 to Io3 of power converters 2a to 2c are controlled such that detected values Io1 to Io3 of current detectors 5a to 5c match current command values IC1 to IC3, respectively, and arcs in switches 1a to 1c are quickly extinguished.

After the arcs in switches 1a to 1c are extinguished, converter control unit 14 outputs voltage command values VC1 to VC3 at levels corresponding to deviations VCA1-Vo1, VCA2-Vo2, and VCA3-Vo3 between voltage command values VCA1 to VCA3 and output voltages Vo1 to Vo3. Thereby, output currents Io1 to Io3 of power converters 2a to 2c are controlled such that output voltages Vo1 to Vo3 match voltage command values VCA1 to VCA3, respectively, and operation of load 52 is continued.

PWM signal generation unit 15 generates PWM signals φ6a to φ6c according to voltage command values VC1 to VC3, respectively, and provides generated PWM signals φ6a to φ6c to power converters 2a to 2c, respectively.

Figure 3:
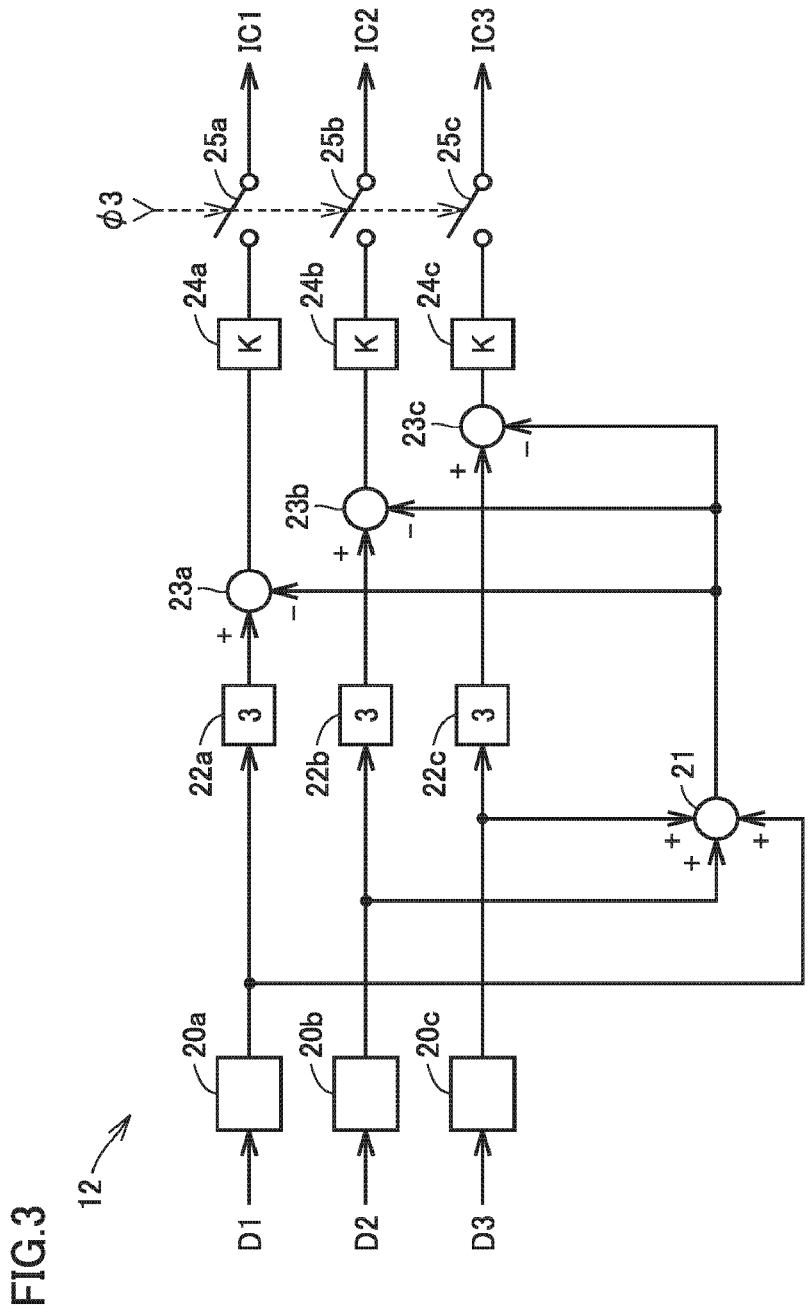
FIG. 3 is a circuit block diagram showing a configuration of a current command unit shown in FIG. 2.

FIG. 3 is a block diagram showing a configuration of current command unit 12. In FIG. 3, current command unit 12 includes signal generators 20a to 20c, an adder 21, multipliers 22a to 22c and 24a to 24c, subtractors 23a to 23c, and switches 25a to 25c.

Signal generators 20a to 20b receive output signals D1 to D3, respectively, of sign determination unit 11. Signal generator 20a outputs "1" when signal D1 is at an "H" level, and outputs "0" when signal D1 is at an "L" level. Signal generator 20b outputs "1" when signal D2 is at an "H" level, and outputs "0" when signal D2 is at an "L" level. Signal generator 20c outputs "1" when signal D3 is at an "H" level, and outputs "0" when signal D3 is at an "L" level.

Adder 21 adds output values of signal generators 20a to 20c. Multipliers 22a to 22c multiply the output values of signal generators 20a to 20c, respectively, by "3". Subtractors 23a to 23c subtract an output value of adder 21 from output values of multipliers 22a to 22c, respectively. Multipliers 24a to 24c multiply output values of subtractors 23a to 23c, respectively, by "K". K is a positive real number. Output values of multipliers 24a to 24c serve as current command values IC1 to IC3, respectively.

Switches 25a to 25c have one terminals for receiving the output values of multipliers 24a to 24c, respectively, and the other terminals connected to converter control unit 14. Switches 25a to 25c are turned off when abnormality detection signal ϕ3 is at an "L" level, which is a non-activated level, and turned on when abnormality detection signal ϕ3 is at an "H" level, which is an activated level.

When switches 1a to 1c are set to an ON state and three phase alternating currents Is1 to Is3 are flowing into switches 1a to 1 c, any two signals of signals D1 to D3 are set to an "H" level and the other signal is set to an "L" level, or any two signals of signals D1 to D3 are set to an "L" level and the other signal is set to an "H" level.

When any two signals (for example, D1 and D2) of signals D1 to D3 are set to an "H" level and the other signal (in this case, D3) is set to an "L" level, any two signal generators (in this case, 20a and 20b) of three signal generators 20a to 20c have an output value "1", the other signal generator (in this case, 20c) has an output value "0", and adder 21 has an output value "2". Any two multipliers (in this case, 22a and 22b) of three multipliers 22a to 22c have an output value "3", and the other multiplier (in this case, 22c) has an output value "0".

Any two subtractors (in this case, 23a and 23b) of three subtractors 23a to 23c have an output value "1", and the other subtractor (in this case, 23c) has an output value "−2". Any two multipliers (in this case, 24a and 24b) of three multipliers 24a to 24c have an output value "K", and the other multiplier (in this case, 24c) has an output value "−2K". Therefore, any two current command values of three current command values IC1 to IC3 are set to "K", the other current command value is set to "−2K", and thus the sum of three current command values IC1 to IC3 is set to K+K−2K=0.

For example, when the polarities of currents Is1, Is2 flowing into switches 1a, 1b are positive, and the polarity of current Is3 flowing into switch 1c is negative, current command values IC1, IC2 are set to "K", and current command value IC3 is set to "−2K". In this case, the polarities of current command values IC1 to IC3 are set to be the same as the polarities of currents Is1 to Is3, respectively, and the sum of values of current command values IC1 to IC3 is set to 0.

When any two signals (for example, D1 and D2) of signals D1 to D3 are set to an "L" level and the other signal (in this case, D3) is set to an "H" level, any two signal generators (in this case, 20a and 20b) of three signal generators 20a to 20c have an output value "0", the other signal generator (in this case, 20c) has an output value "1", and adder 21 has an output value "1". Any two multipliers (in this case, 22a and 22b) of three multipliers 22a to 22c have an output value "0", and the other multiplier (in this case, 22c) has an output value "3".

Any two subtractors (in this case, 23a and 23b) of three subtractors 23a to 23c have an output value "−1", and the other subtractor (in this case, 23c) has an output value "2". Any two multipliers (in this case, 24a and 24b) of three multipliers 24a to 24c have an output value "−K", and the other multiplier (in this case, 24c) has an output value "2K". Therefore, any two current command values of three current command values IC1 to IC3 are set to "−K", the other current command value is set to "2K", and thus the sum of three current command values IC1 to IC3 is set to −K−K+2K=0.

For example, when the polarities of currents Is1, Is2 flowing into switches 1a, 1b are negative, and the polarity of current Is3 flowing into switch 1c is positive, current command values IC1, IC2 are set to "−K", and current command value IC3 is set to "2K". In this case, the polarities of current command values IC1 to IC3 are set to be the same as the polarities of currents Is1 to Is3, respectively, and the sum of values of current command values IC1 to IC3 is set to 0.

That is, when the polarities of currents Is1, Is2 flowing into switches 1a, 1b are the same, absolute values of current command values IC1, IC2 are set to "K" (a first value), and an absolute value of current command value IC3 is set to "2K" (a second value). When the polarities of currents 1s2, 1s3 flowing into switches 1b, 1c are the same, an absolute values of current command values IC2, IC3 are set to "K", and an absolute value of current command value IC1 is set to "2K". When the polarities of currents Is3, Is1 flowing into switches 1c, 1a are the same, an absolute values of current command values IC3, IC1 are set to "K", and an absolute value of current command value IC2 is set to "2K".

When arcs in switches 1a to 1c are extinguished and currents Is1 to Is3 flowing into switches 1a to 1c become sufficiently small, signals D1 to D3 are all set to an "L" level. In this case, signal generators 20a to 20c, adder 21, multipliers 22a to 22c and 24a to 24c, and subtractors 23a to 23c all have an output value "0", and current command values IC1 to IC3 all become 0. When current command values IC1 to IC3 all become 0, converter control unit 14 determines that arcs in switches 1a to 1c have been extinguished.

Next, operation of this uninterruptible power supply device will be described. When three phase AC voltages Vi1 to Vi3 supplied from commercial AC power supply 51 are normal, abnormality detection signal ϕ3 is set to an "L" level, which is a non-activated level, by abnormality detector 3. When abnormality detection signal ϕ3 is at an "L" level, an ON command signal is provided from switch control unit 10 to switches 1a to 1c to set switches 1a to 1c to an ON state, the three phase alternating currents are supplied from commercial AC power supply 51 to load 52 via switches 1a to 1c, and load 52 is operated. On this occasion, power converters 2a to 2c are set to a standby state.

When three phase AC voltages Vi1 to Vi3 supplied from commercial AC power supply 51 become abnormal, abnormality detection signal ϕ3 is set to an "H" level, which is an activated level, by abnormality detector 3. When abnormality detection signal ϕ3 is set to an "H" level, an OFF command signal is provided from switch control unit 10 to switches 1a to 1c, and power converters 2a to 2c are driven by the DC power of DC power supply 53 and output direct currents Io1 to Io3.

On this occasion, the polarities of direct currents Io1 to Io3 are set to be the same as the polarities of currents Is1 to Is3 flowing into switches 1a to 1c, respectively. The sum of values of direct currents Io1 to Io3 is set to 0. Load currents IL1 to IL3 are at least partially replaced by direct currents Io1 to Io3 and currents Is1 to Is3 flowing into switches 1a to 1c are reduced, and arcs in switches 1a to 1c are quickly extinguished and switches 1a to 1c are set to an OFF state. When switches 1a to 1c are set to an OFF state, the three phase alternating currents are supplied from power converters 2a to 2c to load 52, and operation of load 52 is continued.

In the first embodiment, when three phase AC voltages Vi1 to Vi3 from commercial AC power supply 51 become abnormal, an OFF command signal is provided to switches 1a to 1c, and direct currents Io1 to Io3 are output from power converters 2a to 2c and arcs in switches 1a to 1c are quickly extinguished. Since the sum of values of direct currents Io1 to Io3 is set to 0 on this occasion, operation of three phases can be balanced, and an uninterruptible power supply device for three phases which operates stably can be achieved.

It should be noted that, in the first embodiment, current detectors 4a to 4c are provided on a side of switches 1a to 1c closer to commercial AC power supply 51, and currents Is1 to Is3 flowing from commercial AC power supply 51 to switches 1a to 1c are detected by current detectors 4a to 4c. However, the same result can be obtained also when current detectors 4a to 4c are provided on a side of switches 1a to 1c closer to load 52, and currents Is1 to Is3 flowing from switches 1a to 1c to load 52 are detected by current detectors 4a to 4c.

Further, in the first embodiment, DC power supply 53 for driving power converters 2a to 2c is provided. However, a battery (power storage device) may be provided as DC power supply 53. When three phase AC voltages Vi1 to Vi3 supplied from commercial AC power supply 51 are normal, control circuit 6 controls power converters 2a to 2c such that a voltage between terminals of the battery becomes a target battery voltage. Power converters 2a to 2c are controlled by control circuit 6, convert three phase AC power supplied from commercial AC power supply 51 via switches 1a to 1c into DC power, and store the DC power in the battery.

When three phase AC voltages Vi1 to Vi3 supplied from commercial AC power supply 51 become abnormal, power converters 2a to 2c are driven by the DC power in the battery, extinguish arcs in switches 1a to 1c, and thereafter supply three phase AC power to load 52. Therefore, even when a power failure occurs, for example, operation of load 52 can be continued during a period in which the DC power is stored in the battery. A capacitor may be provided instead of the battery.

Second Embodiment

Figure 4:
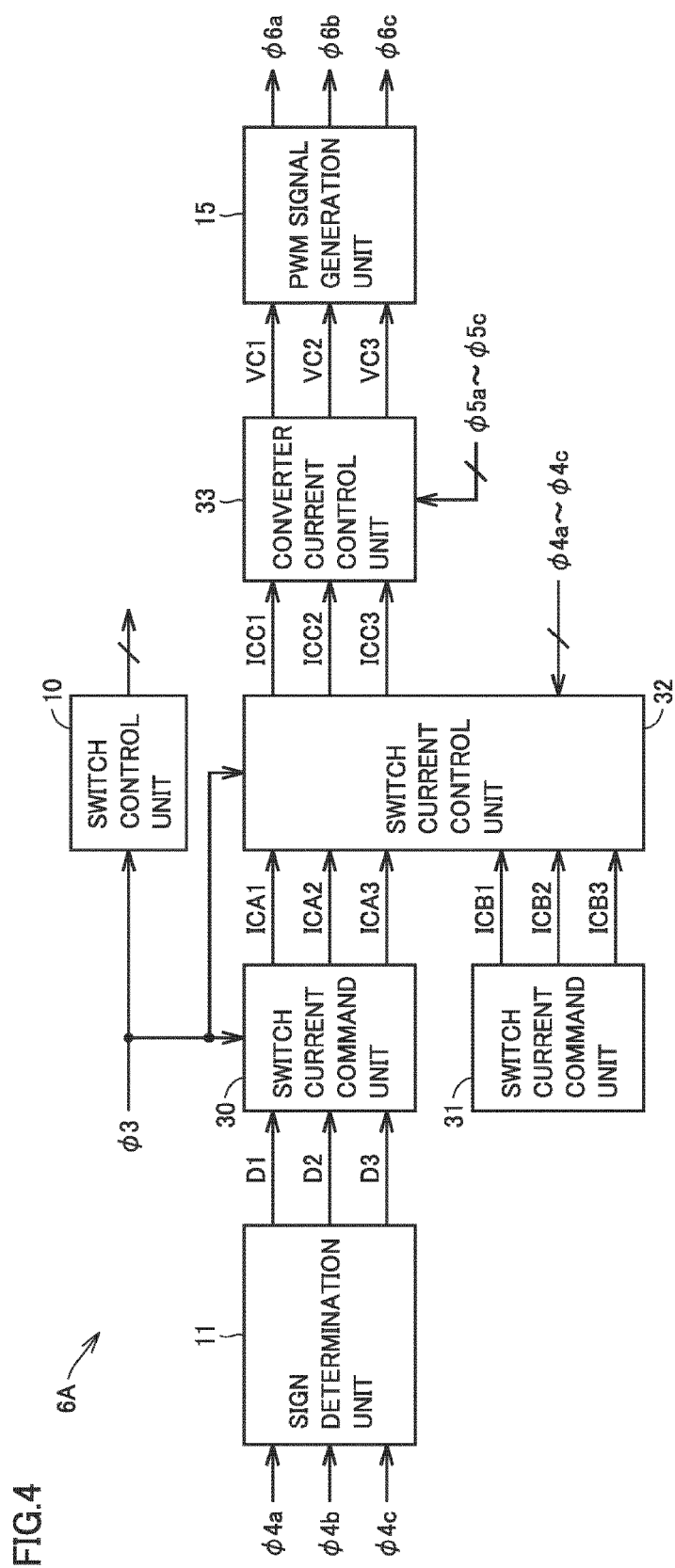
FIG. 4 is a block diagram showing a configuration of a control circuit included in an uninterruptible power supply device in accordance with a second embodiment of the present invention.

FIG. 4 is a block diagram showing a configuration of a control circuit 6A included in an uninterruptible power supply device in accordance with a second embodiment of the present invention, and is a diagram to be compared with FIG. 2. The entire configuration of the uninterruptible power supply device is as shown in FIG. 1.

Control circuit 6A controls switches 1a to 1c and power converters 2a to 2c, based on output signal ϕ3 of abnormality detector 3, output signals ϕ4a to ϕ4c of current detectors 4a to 4c, output signals ϕ5a to ϕ5c of current detectors 5a to 5c, and the like.

When abnormality detection signal ϕ3 is at an "L" level, which is a non-activated level, control circuit 6A provides an ON command signal to switches 1a to 1c to set them to an ON state. In this case, three phase alternating currents are supplied from commercial AC power supply 51 to load 52 via switches 1a to 1c, and load 52 is operated.

When abnormality detection signal ϕ3 is set to an "H" level, which is an activated level, control circuit 6A controls output currents Io1 to Io3 of power converters 2a to 2c such that currents 1s1 to 1s3 flowing into switches 1a to 1c become direct currents IDC1 to IDC3, respectively, to extinguish arcs in switches 1a to 1c. On this occasion, polarities of direct currents IDC1 to IDC3 are opposite to polarities of currents Is1 to Is3 flowing into switches 1a to 1c, respectively, and the sum of values of direct currents IDC1 to IDC3 is set to 0. Absolute values of direct currents IDC1 to IDC3 are set to values which are sufficiently smaller than amplitudes of three phase alternating currents Is1 to Is3 flowing into switches 1a to 1c.

After the arcs in switches 1a to 1c are extinguished, control circuit 6A causes power converters 2a to 2c to supply three phase alternating currents to load 52 to continue operation of load 52.

In FIG. 4, control circuit 6A differs from control circuit 6 of FIG. 2 in that current command unit 12, voltage command unit 13, and converter control unit 14 are replaced by switch current command units 30 and 31, a switch current control unit 32, and a converter current control unit 33.

Switch current command unit 30 is activated when abnormality detection signal ϕ3 is set to an "H" level, which is an activated level, and generates current command values ICA1 to ICA3 which are target values of output currents Io1 to Io3 of power converters 2a to 2c, such that direct currents IDC1 to IDC3 having the polarities opposite to those of currents Is1 to Is3 flowing into switches 1a to 1c flow into switches 1a to 1c. Currents Is1 to Is3 flowing into switches 1a to 1c become 0 A while changing toward direct currents IDC1 to IDC3, respectively, and arcs in switches 1a to 1c are quickly extinguished. On this occasion, the sum of current command values ICA1 to ICA3 is set to 0, and the sum of values of direct currents IDC1 to IDC3 is set to 0.

Switch current command unit 31 generates current command values ICB1 to ICB3 which are target values of output currents Io1 to Io3 of power converters 2a to 2c, such that currents Io1 to Io3 which vary sinusoidally with the same frequencies as those of AC voltages Vi1 to Vi3 supplied from commercial AC power supply 51 flow into switches 1a to 1c. Current command values ICA1 to ICA3 and ICB1 to ICB3 are provided to switch current control unit 32.

Switch current control unit 32 operates based on abnormality detection signal ϕ3, current command values ICA1 to ICA3, and output signals ϕ4a to ϕ4c of current detectors 4a to 4c.

When abnormality detection signal ϕ3 is at an "L" level, which is a non-activated level, switch current control unit 32 outputs current command values ICC1 to ICC3 at levels corresponding to deviations ICB1-Is1, ICB2-Is2, and ICB3-Is3 between current command values ICB1 to ICB3 and detected values Is1 to Is3 of current detectors 4a to 4c. Thereby, output currents Io1 to Io3 of power converters 2a to 2c are controlled such that detected values 1s1 to Is3 of current detectors 4a to 4c match current command values ICB1 to ICB3, respectively, and power converters 2a to 2c are set to a standby state.

When abnormality detection signal ϕ3 is set to an "H" level, which is an activated level, switch current control unit 32 outputs current command values ICC1 to ICC3 at levels corresponding to deviations ICA1-Is1, ICA2-Is2, and ICA3-Is3 between current command values ICA1 to ICA3 and detected values Is1 to Is3 of current detectors 4a to 4c. Thereby, output currents Io1 to Io3 of power converters 2a to 2c are controlled such that detected values Is1 to Is3 of current detectors 4a to 4c match current command values ICA1 to ICA3, respectively, and arcs in switches 1a to 1c are extinguished.

After the arcs in switches 1a to 1c are extinguished, switch current control unit 32 outputs current command values ICC1 to ICC3 at levels corresponding to deviations ICB1-Is1, ICB2-Is2, and ICB3-Is3 between current command values ICB1 to ICB3 and detected values Is1 to Is3 of current detectors 4a to 4c. Thereby, output currents Io1 to Io3 of power converters 2a to 2c are controlled such that detected values Is1 to Is3 of current detectors 4a to 4c match current command values ICB1 to ICB3, respectively, and operation of load 52 is continued.

Converter current control unit 33 outputs voltage command values VC1 to VC3 at levels corresponding to deviations ICC1-Io1, ICC2-Io2, and ICC3-Io3 between current command values ICC1 to ICC3 and detected values Io1 to Io3 of current detectors 5a to 5c.

PWM signal generation unit 15 generates PWM signals φ6a to φ6c according to voltage command values VC1 to VC3, respectively, and provides generated PWM signals φ6a to φ6c to power converters 2a to 2c, respectively.

Figure 5:
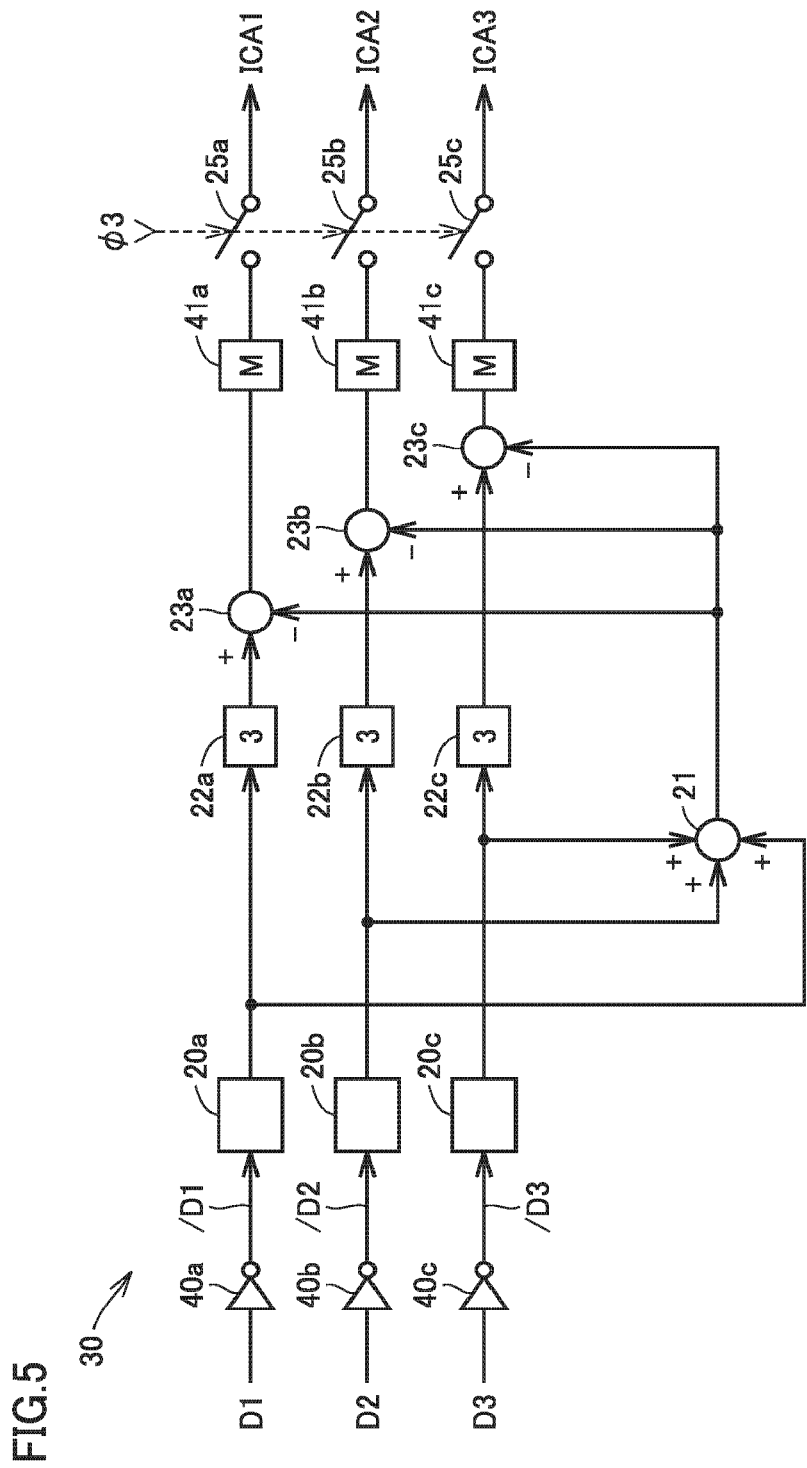
FIG. 5 is a circuit block diagram showing a configuration of a switch current command unit 30 shown in FIG. 4.

FIG. 5 is a block diagram showing a configuration of switch current command unit 30, and is a diagram to be compared with FIG. 3. Referring to FIG. 5, switch current command unit 30 differs from current command unit 12 of FIG. 3 in that inverters 40a to 40c are added, and multipliers 24a to 24c are replaced by multipliers 41a to 41c. Inverters 40a to 40c receive output signals D1 to D3 of sign determination unit 11, and output inverted signals /D1 to /D3 of signals D1 to D3, respectively. Multipliers 41a to 41c multiply output values of subtractors 23a to 23c, respectively, by "M". M is a positive real number. Output values of multipliers 41a to 41c serve as current command values ICA1 to ICA3, respectively.

Switches 25a to 25c have one terminals for receiving the output values of multipliers 41a to 41c, respectively, and the other terminals connected to switch current control unit 32. Switches 25a to 25c are turned off when abnormality detection signal φ3 is at an "L" level, which is a non-activated level, and turned on when abnormality detection signal φ3 is at an "H" level, which is an activated level.

When switches 1a to 1c are set to an ON state and the three phase alternating currents are flowing into switches 1a to 1c, any two signals of signals D1 to D3 are set to an "H" level and the other signal is set to an "L" level, or any two signals of signals D1 to D3 are set to an "L" level and the other signal is set to an "H" level.

When any two signals (for example, D1 and D2) of signals D1 to D3 are set to an "H" level and the other signal (in this case, D3) is set to an "L" level, any two signals (in this case, /D1 and /D2) of signals /D1 to /D3 are set to an "L" level, and the other signal (in this case, /D3) is set to an "H" level.

In this case, any two signal generators (in this case, 20a and 20b) of three signal generators 20a to 20c have an output value "0", the other signal generator (in this case, 20c) has an output value "1", and adder 21 has an output value "1". Any two multipliers (in this case, 22a and 22b) of three multipliers 22a to 22c have an output value "0", and the other multiplier (in this case, 22c) has an output value "3". Any two subtractors (in this case, 23a and 23b) of three subtractors 23a to 23c have an output value "−1", and the other subtractor (in this case, 23c) has an output value "2". Any two multipliers (in this case, 41a and 41b) of three multipliers 41a to 41c have an output value "−M", and the other multiplier (in this case, 41c) has an output value "2M". Therefore, any two current command values (in this case, ICA1 and ICA2) of three current command values ICA1 to ICA3 are set to "−M", the other current command value (in this case, ICA3) is set to "2M", and thus the sum of three current command values ICA1 to ICA3 is set to −M−M+2M=0.

For example, when the polarities of currents Is1, Is2 flowing into switches 1a, 1b are positive, and the polarity of current 1s3 flowing into switch 1c is negative, current command values ICA1, ICA2 are set to "−M", and current command value ICA3 is set to "2M". In this case, the polarities of current command values ICA1 to ICA3 are set to be opposite to the polarities of currents Is1 to Is3, respectively, and the sum of values of current command values ICA1 to ICA3 is set to 0.

When any two signals (for example, D1 and D2) of signals D1 to D3 are set to an "L" level and the other signal (in this case, D3) is set to an "H" level, any two signals (in this case, /D1 and /D2) of signals /D1 to /D3 are set to an "H" level, and the other signal (in this case, /D3) is set to an "L" level.

In this case, any two signal generators (in this case, 20a and 20b) of three signal generators 20a to 20c have an output value "1", the other signal generator (in this case, 20c) has an output value "0", and adder 21 has an output value "2". Any two multipliers (in this case, 22a and 22b) of three multipliers 22a to 22c have an output value "3", and the other multiplier (in this case, 22c) has an output value "0". Any two subtractors (in this case, 23a and 23b) of three subtractors 23a to 23c have an output value "1", and the other subtractor (in this case, 23c) has an output value "−2". Any two multipliers (in this case, 41a and 41b) of three multipliers 41a to 41c have an output value "M", and the other multiplier (in this case, 41c) has an output value "−2M". Therefore, any two current command values (in this case, ICA1 and ICA2) of three current command values ICA1 to ICA3 are set to "M", the other current command value (in this case, ICA3) is set to "−2M", and thus the sum of three current command values ICA1 to ICA3 is set to M+M−2M=0.

For example, when the polarities of currents Is1, Is2 flowing into switches 1a, 1b are negative, and the polarity of current Is3 flowing into switch 1c is positive, current command values ICA1, ICA2 are set to "M", and current command value ICA3 is set to "−2M". In this case, the polarities of current command values ICA1 to ICA3 are set to be opposite to the polarities of currents Is1 to Is3, respectively, and the sum of values of current command values ICA1 to ICA3 is set to 0.

That is, when the polarities of currents Is1, Is2 flowing into switches 1a, 1b are the same, absolute values of current command values ICA1, ICA2 are set to "M" (a first value), and an absolute value of current command value ICA3 is set to "2M" (a second value). When the polarities of currents Is2, Is3 flowing into switches 1b, 1c are the same, an absolute values of current command values ICA2, ICA3 are set to "M", and an absolute value of current command value ICA1 is set to "2M". When the polarities of currents Is3, Is1 flowing into switches 1c, 1a are the same, an absolute values of current command values ICA3, ICA1 are set to "M", and an absolute value of current command value ICA2 is set to "2M".

When arcs in switches 1a to 1c are extinguished and currents Is1 to Is3 flowing into switches 1a to 1 c become sufficiently small, signals /D1 to /D3 are all set to an "H" level. In this case, signal generators 20a to 20c all have an output value "1", adder 21 and multipliers 22a to 22c all have an output value "3", subtractors 23a to 23c and multipliers 41a to 41c all have an output value "0", and current command values ICA1 to ICA3 all become 0. When current command values ICA1 to ICA3 all become 0, switch current control unit 32 determines that arcs in switches 1a to 1c have been extinguished.

Next, operation of this uninterruptible power supply device will be described. When three phase AC voltages Vi1 to Vi3 supplied from commercial AC power supply 51 are normal, abnormality detection signal φ3 is set to an "L" level, which is a non-activated level, by abnormality detector 3. When abnormality detection signal φ3 is at an "L" level, an ON command signal is provided from switch control unit 10 to switches 1a to 1c to set switches 1a to 1c to an ON state, the three phase alternating currents are supplied from commercial AC power supply 51 to load 52 via switches 1a to 1c, and load 52 is operated. On this occasion, power converters 2a to 2c are set to a standby state.

When three phase AC voltages Vi1 to Vi3 supplied from commercial AC power supply 51 become abnormal, abnormality detection signal φ3 is set to an "H" level, which is an activated level, by abnormality detector 3. When abnormality detection signal φ3 is set to an "H" level, an OFF command signal is provided from switch control unit 10 to switches 1a to 1c, and power converters 2a to 2c are controlled such that direct currents IDC1 to IDC3 having the polarities opposite to those of currents Is1 to Is3 flowing into switches 1a to 1c flow into switches 1a to 1c. Power converters 2a to 2c are driven by the DC power of DC power supply 53 and output direct currents Io1 to Io3.

On this occasion, the sum of direct currents IDC1 to IDC3 is set to 0. When currents Is1 to Is3 flowing into switches 1a to 1c change toward direct currents IDC1 to IDC3 having opposite polarities, values of currents Is1 to Is3 flowing into switches 1a to 1c are reduced, and arcs in switches 1a to 1c are quickly extinguished and switches 1a to 1c are set to an OFF state. When switches 1a to 1c are set to an OFF state, the three phase alternating currents are supplied from power converters 2a to 2c to load 52, and operation of load 52 is continued.

It should be noted that, when direct currents IDC1 to IDC3 are passed to switches 1a to 1c but arcs in switches 1a to 1c cannot be extinguished, output currents Io1 to Io3 of power converters 2a to 2c are controlled again such that direct currents IDC1 to IDC3 having the polarities opposite to those of direct currents IDC1 to IDC3 flowing into switches 1a to 1c flow into switches 1a to 1c. This operation is repeated until the arcs in switches 1a to 1c are extinguished.

In the second embodiment, when three phase AC voltages Vi1 to Vi3 from commercial AC power supply 51 become abnormal, an OFF command signal is provided to switches 1a to 1c, and power converters 2a to 2c are controlled such that direct currents IDC1 to IDC3 having the polarities opposite to those of currents Is1 to Is3 flowing into switches 1a to 1c flow into switches 1a to 1c, and arcs in switches 1a to 1c are quickly extinguished. Since the sum of values of direct currents IDC1 to IDC3 is set to 0 A on this occasion, operation of three phases can be balanced, and an uninterruptible power supply device for three phases which operates stably can be achieved.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

TI to TI3: input terminal; TO1 to TO3: output terminal; 1a to 1c, 25a to 25c: switch; 2a to 2c: power converter; 3: abnormality detector; 4a to 4c, 5a to 5c: current detector; 6, 6A: control circuit; 10: switch control unit; 11: sign determination unit; 12: current command unit; 13: voltage command unit; 14: converter control unit; 15: PWM signal generation unit; 20a to 20c: signal generator; 21: adder; 22a to 22c, 24a to 24c, 41a to 41c: multiplier; 23a to 23c: subtractor; 30, 31: switch current command unit; 32: switch current control unit; 33: converter current control unit; 40a to 40c: inverter; 51: commercial AC power supply; 52: load; 53: DC power supply.

The invention claimed is:
1. A continuous commercial power supply-type uninterruptible power supply device, comprising:
first to third output terminals for supplying three phase alternating currents to a load;
first to third switches without having self arc extinguishing capability, having first terminals for receiving three phase AC voltages from a commercial AC power supply, and second terminals connected to the first to third output terminals, respectively;
first to third power converters connected to the first to third output terminals, respectively, and driven by DC power supplied from a DC power supply;
an abnormality detector configured to detect that the three phase AC voltages from the commercial AC power supply become abnormal;
first to third current detectors configured to detect instantaneous values of currents flowing into the first to third switches, respectively; and
a control circuit configured to control the first to third switches and the first to third power converters based on detection results of the abnormality detector and the first to third current detectors, wherein
when the three phase AC voltages from the commercial AC power supply are normal, the first to third switches are set to an ON state, and three phase alternating currents are supplied from the commercial AC power supply to the load via the first to third switches,
when the three phase AC voltages from the commercial AC power supply become abnormal, an OFF command signal is provided from the control circuit to the first to third switches, first to third direct currents are output from the first to third power converters, respectively, and arcs in the first to third switches are extinguished, and further, three phase alternating currents are supplied from the first to third power converters to the load and operation of the load is continued, and
when a polarity of a current flowing from the first terminal toward the second terminal of each of the first to third switches is assumed as a positive polarity, and polarities of currents flowing from the first to third power converters toward the first to third output terminals, respectively, are each assumed as a positive polarity, polarities of the first to third direct currents are the same as polarities of the currents flowing into the first to third switches, respectively, and a sum of values of the first to third direct currents is set to 0.

2. The uninterruptible power supply device according to claim 1, wherein
the control circuit is configured to determine the polarity of each of the currents flowing into the first to third switches based on the detection results of the first to third current detectors, and set the polarities of the first to third direct currents to be the same as the polarities of the currents flowing into the first to third switches, respectively, based on determination results thereof,
when the polarities of the currents flowing into the first and second switches are the same, the control circuit is configured to set an absolute value of a value of each of the first and second direct currents to a first value, and set an absolute value of a value of the third direct current to a second value which is double the first value, when the polarities of the currents flowing into the second and third switches are the same, the control circuit is configured to set an absolute value of a value of each of the second and third direct currents to the first value, and set an absolute value of a value of the first direct current to the second value, when the polarities of the currents flowing into the third and first switches are the same, the control circuit is configured to set an absolute value of a value of each of the third and first direct currents to the first value, and set an absolute value of a value of the second direct current to the second value, and the first to third power converters output the first to third direct currents set by the control circuit.

3. The uninterruptible power supply device according to claim 1, wherein the DC power supply is a power storage device for storing DC power, and when the three phase AC voltages from the commercial AC power supply are normal, the first to third power converters convert three phase AC power supplied from the commercial AC power supply via the first to third switches into DC power, and store the DC power in the power storage device, and when the three phase AC voltages from the commercial AC power supply become abnormal, the first to third power converters are driven by the DC power in the power storage device, and output the first to third direct currents and the three phase alternating currents.

4. A continuous commercial power supply-type uninterruptible power supply device, comprising:

first to third output terminals for supplying three phase alternating currents to a load;

first to third switches without having self arc extinguishing capability, having first terminals for receiving three phase AC voltages from a commercial AC power supply, and second terminals connected to the first to third output terminals, respectively;

first to third power converters connected to the first to third output terminals, respectively, and driven by DC power supplied from a DC power supply;

an abnormality detector configured to detect that the three phase AC voltages from the commercial AC power supply become abnormal;

first to third current detectors configured to detect instantaneous values of currents flowing into the first to third switches, respectively; and a control circuit configured to control the first to third switches and the first to third power converters based on detection results of the abnormality detector and the first to third current detectors, wherein when the three phase AC voltages from the commercial AC power supply are normal, the first to third switches are set to an ON state, and three phase alternating currents are supplied from the commercial AC power supply to the load via the first to third switches, when the three phase AC voltages from the commercial AC power supply become abnormal, an OFF command signal is provided from the control circuit to the first to third switches, output currents of the first to third power converters are controlled such that the currents flowing into the first to third switches become first to third direct currents, respectively, and arcs in the first to third switches are extinguished, and further, three phase alternating currents are supplied from the first to third power converters to the load and operation of the load is continued, and when a polarity of a current flowing from the first terminal toward the second terminal of each of the first to third switches is assumed as a positive polarity, polarities of the first to third direct currents are opposite to polarities of the currents flowing into the first to third switches, respectively, and a sum of values of the first to third direct currents is set to 0.

5. The uninterruptible power supply device according to claim 4, wherein the control circuit is configured to determine the polarity of each of the currents flowing into the first to third switches based on the detection results of the first to third current detectors, and set the polarities of the first to third direct currents to be opposite to the polarities of the currents flowing into the first to third switches, respectively, based on determination results thereof, when the polarities of the currents flowing into the first and second switches are the same, the control circuit is configured to set an absolute value of a value of each of the first and second direct currents to a first value, and set an absolute value of a value of the third direct current to a second value which is double the first value, when the polarities of the currents flowing into the second and third switches are the same, the control circuit is configured to set an absolute value of a value of each of the second and third direct currents to the first value, and set an absolute value of a value of the first direct current to the second value, when the polarities of the currents flowing into the third and first switches are the same, the control circuit is configured to set an absolute value of a value of each of the third and first direct currents to the first value, and set an absolute value of a value of the second direct current to the second value, and the first to third power converters output the first to third direct currents set by the control circuit.

6. The uninterruptible power supply device according to claim 4, wherein the DC power supply is a power storage device for storing DC power, and when the three phase AC voltages from the commercial AC power supply are normal, the first to third power converters convert three phase AC power supplied from the commercial AC power supply via the first to third switches into DC power, and store the DC power in the power storage device, and when the three phase AC voltages from the commercial AC power supply become abnormal, the first to third power converters are driven by the DC power in the power storage device, and output the first to third direct currents and the three phase alternating currents.

* * * * *